E. CATHELS.
SEALING DEVICE.
APPLICATION FILED DEC. 2, 1909.

991,479.

Patented May 9, 1911.

WITNESSES
Chas E Smith
Wallace C Parsons

INVENTOR
Edmund Cathels
per D Schofield
ATTORNEY

UNITED STATES PATENT OFFICE.

EDMUND CATHELS, OF PROVIDENCE, RHODE ISLAND.

SEALING DEVICE.

991,479.  Specification of Letters Patent.  Patented May 9, 1911.

Application filed December 2, 1909. Serial No. 531,098.

*To all whom it may concern:*

Be it known that I, EDMUND CATHELS, a citizen of the United States, residing at Providence, in the State of Rhode Island, have invented a new and useful Improvement in Sealing Devices, of which the following is a specification.

The nature of my invention consists in a device adapted for attachment to various articles, whereby, if the said articles are tampered with, the fact will become known, and with the acquirement of such knowledge future tampering with the same may be prevented. And my invention is especially adapted for securely sealing stop cocks fitted upon pipes containing either gas or liquids, the flow of which through the said pipes is liable to be tampered with.

Figure 1:
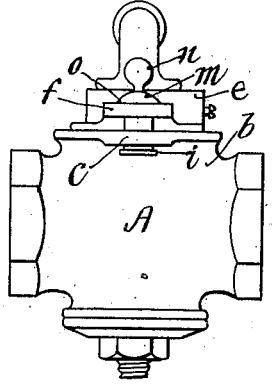
Figure 2:
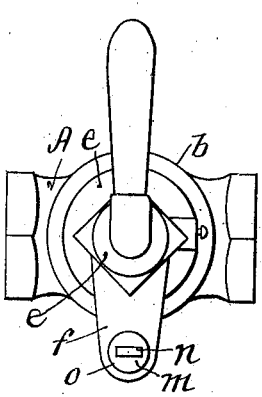
Figure 3:
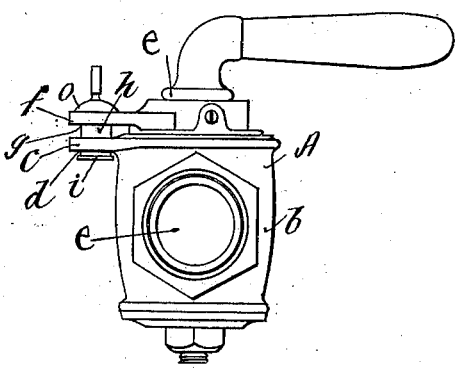
Figure 4:
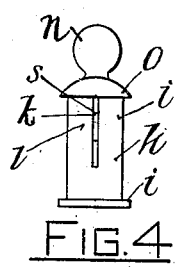
Figure 5:
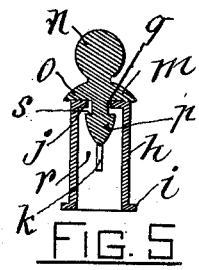
Figure 8:
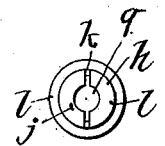
Figure 6:
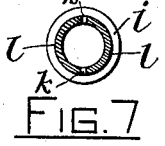
Figure 7:
Figure 10:
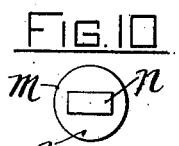
Figure 9:
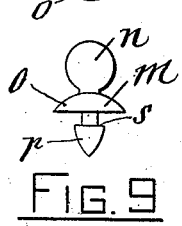

In the accompanying drawings:—Figure 1 represents the side view of a stop cock to which my invention is applied. Fig. 2 represents a top view of the same. Fig. 3 represents an end view of the same. Fig. 4 represents a side view of my improved sealing device. Fig. 5 represents an axial section of the same. Fig. 6 represents a side view as in Fig. 4, of the clasping member of the device. Fig. 7 represents a section taken in the line 7, 7, of Fig. 6. Fig. 8 represents an end view of the said clasping member. Fig. 9 represents a side view of the key piece. Fig. 10 represents an end view of the same.

In the drawing, A represents a stop cock the barrel $b$ of which is provided with the projecting arm $c$, having a perforation at $d$. The valve $e$ of the stop cock is also provided with a projecting arm $f$ having a perforation $g$, the said perforations $d$ and $g$ being adapted to receive the clasping member $h$ of the device, the said member being made in hollow cylinder form with an outwardly turned flange $i$ at one end and an inwardly turned flange $j$ at the other and also provided with the diametrical slit $k$ whereby the sides $l\ l$, of the said clasping member are made resilient. The key piece $m$ is provided with a head $n$, a flange $o$, and a conical knob $p$, which when forced through the opening $q$ in the resilient end of the clasping member $h$ and into the enlarged chamber $r$, serves to lock the said parts together by means of the intervening shoulder $s$, as shown in Fig. 5.

The clasping member $h$ may be made of steel or other metal, and the key piece $m$ may be made of cast iron or glass; and in using this improved sealing device, the conical knob $p$ of the key piece $j$ is to be pressed into the opening $g$, the tapering sides of the said conical knob serving to force the sides $l,\ l$, of the clasping member apart to allow the entrance of the knob $p$ into the chamber $r$ to be held therein by the inward springing of the said sides; and in this case, the cast iron or glass key piece, cannot be withdrawn without being broken and thus revealing the fact that the seal has been tampered with.

If two or more articles of any kind that have holes of a larger diameter than the outside diameter of the clasping member, but of a smaller diameter than the outwardly extending flange $i$, are so arranged that the said clasping member can be placed in the said holes and have the fragile key piece $m$, inserted into the chamber of the clasping member, they will be sealed to each other so that their removal from each other would be detected. The method of breaking the seal when desired, is to break off the outer portion of the key piece at the weak part or neck at the back of the knob.

I claim as my invention:

In a sealing device, a tubular clasping member provided with an outwardly turned flange at one end and with an inwardly turned flange at the other, and also provided with longitudinal slits whereby the sides of the said clasping member are made resilient, in combination with a key-piece provided with a head, a flange, and a conical knob, with a brittle contracted neck between the said knob and flange whereby when the conical knob of the key-piece is forced through the opening in the resilient inwardly flanged end of the clasping member, the parts will be locked together by means of the inwardly springing end of the clasping member, and a shoulder at the back of the said conical knob, and when desired the contracted neck may be readily broken.

EDMUND CATHELS.

Witnesses:
SOCRATES SCHOLFIELD,
BENJAMIN L. DENNIS.

Copies of this patent may be obtained for five cents each, by addressing the "Commissioner of Patents, Washington, D. C."